United States Patent
Daggett

(10) Patent No.: US 7,281,041 B2
(45) Date of Patent: Oct. 9, 2007

(54) METHOD AND APPARATUS FOR PROVIDING A BASELINING AND AUTO-THRESHOLDING FRAMEWORK

(75) Inventor: Jeremy Daggett, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 786 days.

(21) Appl. No.: 10/284,247

(22) Filed: Oct. 31, 2002

(65) Prior Publication Data

US 2004/0088400 A1    May 6, 2004

(51) Int. Cl.
 *G06F 11/30* (2006.01)
(52) U.S. Cl. ........................... 709/224; 709/223
(58) Field of Classification Search ........... 709/224, 709/223
See application file for complete search history.

(56) References Cited

U.S. PATENT DOCUMENTS

| | | | |
|---|---|---|---|
| 5,974,457 A * | 10/1999 | Waclawsky et al. | 709/224 |
| 6,317,786 B1 * | 11/2001 | Yamane et al. | 709/224 |
| 6,557,035 B1 * | 4/2003 | McKnight | 709/224 |
| 6,675,128 B1 * | 1/2004 | Hellerstein | 702/182 |
| 7,076,695 B2 * | 7/2006 | McGee et al. | 714/47 |
| 2002/0173997 A1 * | 11/2002 | Menard et al. | 705/7 |
| 2003/0139905 A1 * | 7/2003 | Helsper et al. | 702/182 |

* cited by examiner

*Primary Examiner*—Kenneth R. Coulter

(57) ABSTRACT

A method and corresponding apparatus for providing a baselining and auto-thresholding framework use a baselining and auto-thresholding system to collect performance data, predict future data values, and notify system administrators of any threshold violation. The baselining and auto-thresholding system is adapted to a wide range of performance metrics (data) for networked storage, and predicts potential performance problems. When the thresholds are violated, the baselining and auto-thresholding system alerts the system administrators so that the system administrators can respond immediately to ensure that networked storage, and the data that resides in the networked storage, stays available.

24 Claims, 3 Drawing Sheets

METHOD AND APPARATUS FOR PROVIDING A BASELINING AND AUTO-THRESHOLDING FRAMEWORK

TECHNICAL FIELD

The technical field relates to database management systems, and, in particular, to baselining and auto-thresholding systems.

BACKGROUND

Faced with growing database storage needs, information technology (IT) departments are increasingly implementing networked storage, such as network-attached storage (NAS) and storage area networks (SANs), as well as direct-attach storage. Managing these heterogeneous and often distributed storage environments is typically a time-consuming manual task, requiring individual management of each storage device. In addition, the IT departments frequently experience "stranded" capacity, e.g., one device cannot be accessed by applications that need the device, or capacity is tied up in stale or wasted storage, resulting in inefficient resource utilization. Therefore, early detection of future performance problems is important to system administrators.

Existing network management systems generally cannot predict future performance behavior based on past performance behavior. In some systems, performance problems are reported when threshold violations occur, but system administrators must configure thresholds based on a hard limit. Configuration of thresholds based on hard limits may be difficult because the system administrators must have an understanding of the current SAN performance to perform this task.

SUMMARY

A method for providing a baselining and auto-thresholding framework includes collecting performance data over an interval, summarizing the performance data into a single data point, updating a baseline object based on the summarized data point, and predicting a next data value based on the summarized data point. The method further includes comparing the predicted data value with an actual collected data value and generating a threshold violation event if a derivation exists between the predicted data value and the actual collected data value.

An apparatus for providing a baselining and auto-thresholding framework includes a data collection module capable of collecting performance data over an interval, and a data summarization module capable of summarizing the performance data into a single data point. The apparatus further includes a baselining module capable of updating a baseline object and predicting a next data value based on the summarized data point and a threshold monitor module capable of comparing the predicted data value with an actual collected data value and generating a threshold violation event if a derivation exists between the predicted data value and the actual collected data value.

A computer readable medium includes instructions for providing a baselining and auto-thresholding framework by collecting performance data over an interval, summarizing the performance data into a single data point, updating a baseline object based on the summarized data point, predicting a next data value based on the summarized data point, comparing the predicted data value with an actual collected data value, and generating a threshold violation event if a derivation exists between the predicted data value and the actual collected data value.

DESCRIPTION OF THE DRAWINGS

The preferred embodiments of the method and apparatus for providing a baselining and auto-thresholding framework will be described in detail with reference to the following figures, in which like numerals refer to like elements, and wherein.

DETAILED DESCRIPTION

A method and corresponding apparatus for providing a baselining and auto-thresholding framework use a baselining and auto-thresholding system to collect performance data, predict future data values based on statistical means, and notify system administrators of any threshold violation. The baselining and auto-thresholding system is adapted to a wide range of performance metrics (data) for networked storage, and predicts potential performance problems. When the thresholds are violated, the baselining and auto-thresholding system alerts the system administrators so that the system administrators can respond immediately to ensure that the networked storage, and the data that resides in the networked storage, stays available.

The baselining and auto-thresholding system may be implemented with a storage area manager (SAM) and a storage optimizer, such as the OPENVIEW® SAM and storage optimizer. The SAM supports enterprise storage utility services with integrated tools that help information technology (IT) departments reduce storage management costs, protect existing storage investments, efficiently utilize resources, and deliver guaranteed quality of service to customers, partners, and employees. The SAM enables system administrators to simplify and automate management of multivendor storage resources across disk, tape, direct-attach, and networked storage infrastructures. The SAM can also centrally manage and monitor availability, performance, usage, growth, and cost across a distributed enterprise. Further, the SAM enables system administrators to optimize resource utilization and operations, and to seamlessly integrate storage and storage services with an enterprise-wide IT service management system.

A storage optimizer may, from a single management station, monitor the performance of all of the components on a storage network, including hosts, infrastructure and storage. The storage optimizer also collects data and provides a complete reporting structure for evaluating, monitoring and managing the quality and cost of IT services. System administrators can receive automatic notification of impending performance problems before the problems become serious, and can track performance of the system components over time. Therefore, the storage optimizer helps system administrators predict problems and improve efficiencies while optimizing investment in networked storage. The combination of performance monitoring, historical tracking, and trend analysis makes the storage optimizer a powerful tool for analyzing and upgrading storage infrastructure.

Figure 1:
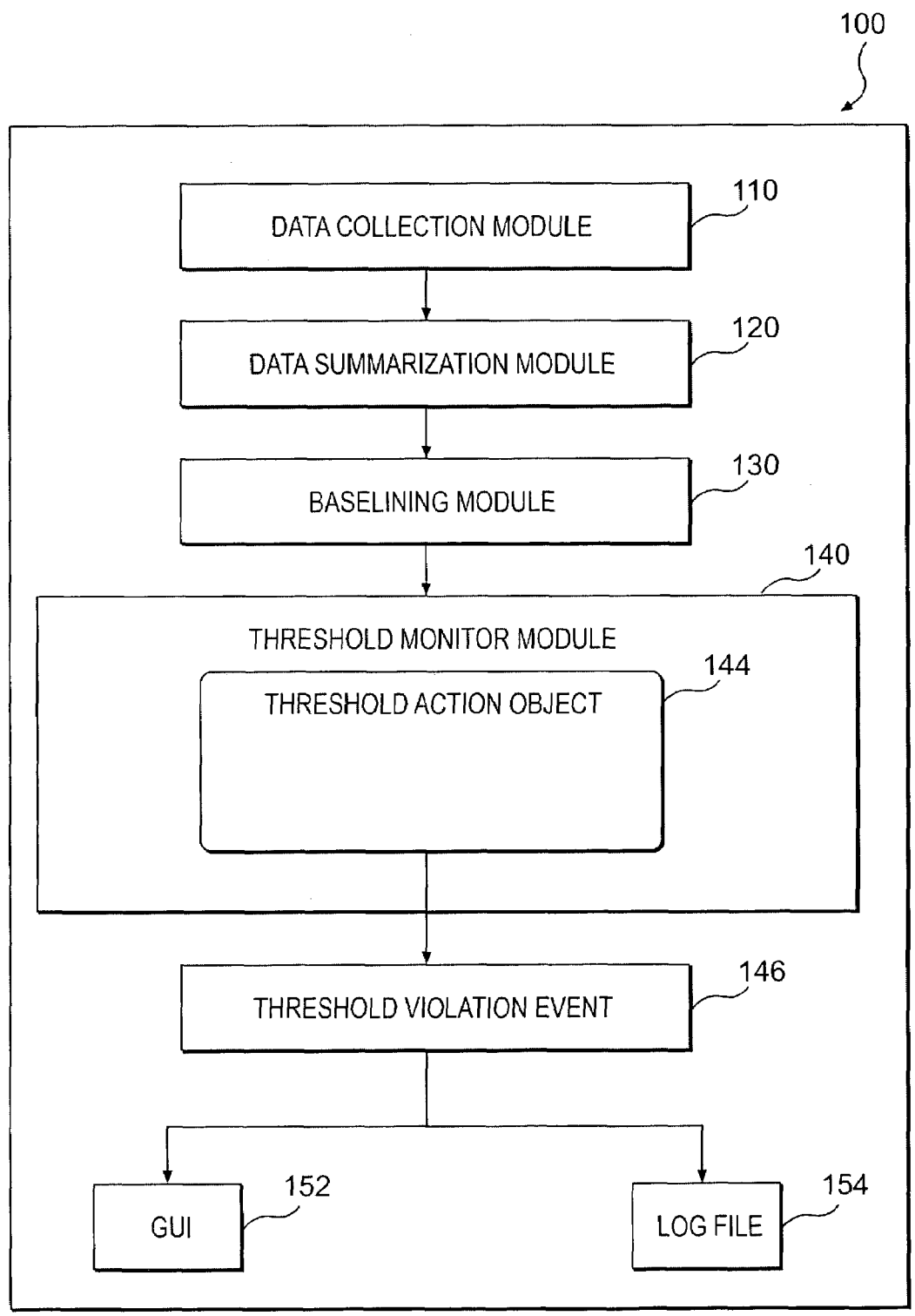
FIG. 1 illustrates an exemplary baselining and auto-thresholding system.

FIG. 1 illustrates an exemplary baselining and auto-thresholding system 100. The baselining and auto-thresholding system 100 is preferably incorporated in a storage optimizer's functionality and provides baselining and auto-thresholding of collected performance metrics. One skilled in the art will appreciate that the baselining and auto-thresholding system 100 may be applied to any networked storage.

Referring to FIG. 1, the baselining and auto-thresholding system 100 includes a data collection module 110 that collects performance data and a data summarization module 120 that performs data summarization. Performance data may be collected from disparate devices in, for example, storage area networks (SANs). Examples of SAN devices include hosts, interconnect devices, and storage devices. A wide variety of performance metrics (data) may be available from each type of device. For example, on hosts, the storage optimizer can collect performance metrics for read and write rates for logical and physical volumes. On interconnect devices, the storage optimizer can collect device level and port level performance metrics for received and transmitted bytes and frames. Since every device is typically different, the metrics that can be collected may be device dependent.

Performance data may be collected at a specified time interval and then summarized (aggregated) into a single average point representing the data collected over a larger time interval. The summarization of the performance data may be accomplished using software code that is resident, for example, within an optimizer application. The data summarization module 120 may collect raw performance data points over a discrete period. Then, the data summarization module 120 may order the raw data points by a percentage of the time period during which the raw data points are collected. Next, the data summarization module 120 may use weighted average calculation, for example, to convert the raw performance data points into a single summarized data point that is representative of the entire time interval. For example, if data are collected every 15 minutes, and the data are summarized every hour, then the single summarized point may represent the aggregate of the collected data points over that hour. After the collected performance data metrics are aggregated through the data summarization process, the data can be displayed to a user in charts and tables. The summarization process is described for illustration purposes only, and one skilled in the art will appreciate that other types of summarization calculation may be equally applied as well.

The summarized data point may be stored in a persistent storage, such as a database, and inputted to a baselining module 130. The baselining module 130 may update or create a baseline object (not shown). A baseline object is an object that contains data and methods necessary for predicting future performance data points based on past data points. The baselining module 130 may update the baseline object, if the baseline object exists, by adding the summarized data point to the baseline object. If the baseline object does not exist, the baseline object may be created by the data summarization module 120 before being updated by the baselining module 130.

After the performance data are collected from the disparate devices and summarized into a single average point, the baselining module 130 may predict a next data point based on the summarized average data point using the data and method contained in the baseline object. For example, the baseline object may contain statistical analysis models to predict future performance data points based on past data points. The statistical analysis models are well known in the art. The baselining module 130 typically relies on statistical analysis of the collected performance data to generate future predictions. An exemplary statistical analysis model provides parameters, such as baseline, trend, season and sensitivity of the data, to an algorithm, which predicts the next data point. In this exemplary statistical analysis model, data points are equally spaced from one another (for example, an hour apart) and at least two season lengths worth of data are available for analysis. A season length may be, for example, a day or a week. Therefore, two season lengths of data may require two days or two weeks of data points to make a prediction. One skilled in the art will appreciate that other types of statistical analysis models may be equally applied to predict the next data point.

The baselining and auto-thresholding system 100 also includes a threshold monitor module 140. The threshold monitor module 140 is responsible for managing one or more threshold action objects 144. A threshold action object 144 typically compares the range of the previously predicted data value with an actual collected data value. The previously predicted data value may have an upper and lower range to be compared against the actual collected data value. The threshold action object 144 may create a threshold entry object (not shown) if a deviation exists between the previously predicted data value and the actual collected data value. In other words, the threshold action object 144 may create a threshold entry object whenever an upper or lower threshold violation occurs. An upper threshold violation occurs, for example, when the actual collected data value is greater than the upper range of the previously predicted data value. Similarly, a lower threshold is violated when the actual collected data value is less than the lower range of the previously predicted data value.

If a deviation exists between the previously predicted data value and the actual collected data value, i.e., threshold is violated, the threshold monitor module 140 may use the threshold action objects 144 to generate a threshold violation event 146 to be sent to system administrators. The system administrators are therefore notified in advance of performance problems to make necessary changes to the system environment. The threshold violation event 146 is typically transmitted to a graphical user interface (GUI) 152 or logged to a log file 154.

The baselining and auto-thresholding system 100 provides a generic mechanism that can be applied to any tagged performance metrics. The threshold determination is performed atomically with respect to updating the baseline object during the data summarization process. In other words, when the baseline object is updated, thresholds are examined at the same time. In addition, the number of data samples used for predictions may be dynamically increased or decreased depending on baselineable metrics. Metrics that are baselineable are typically throughput and input or output related metrics. For example, the number of data samples needed for predictions can be configured by a user to either a day or a week.

Figure 2:
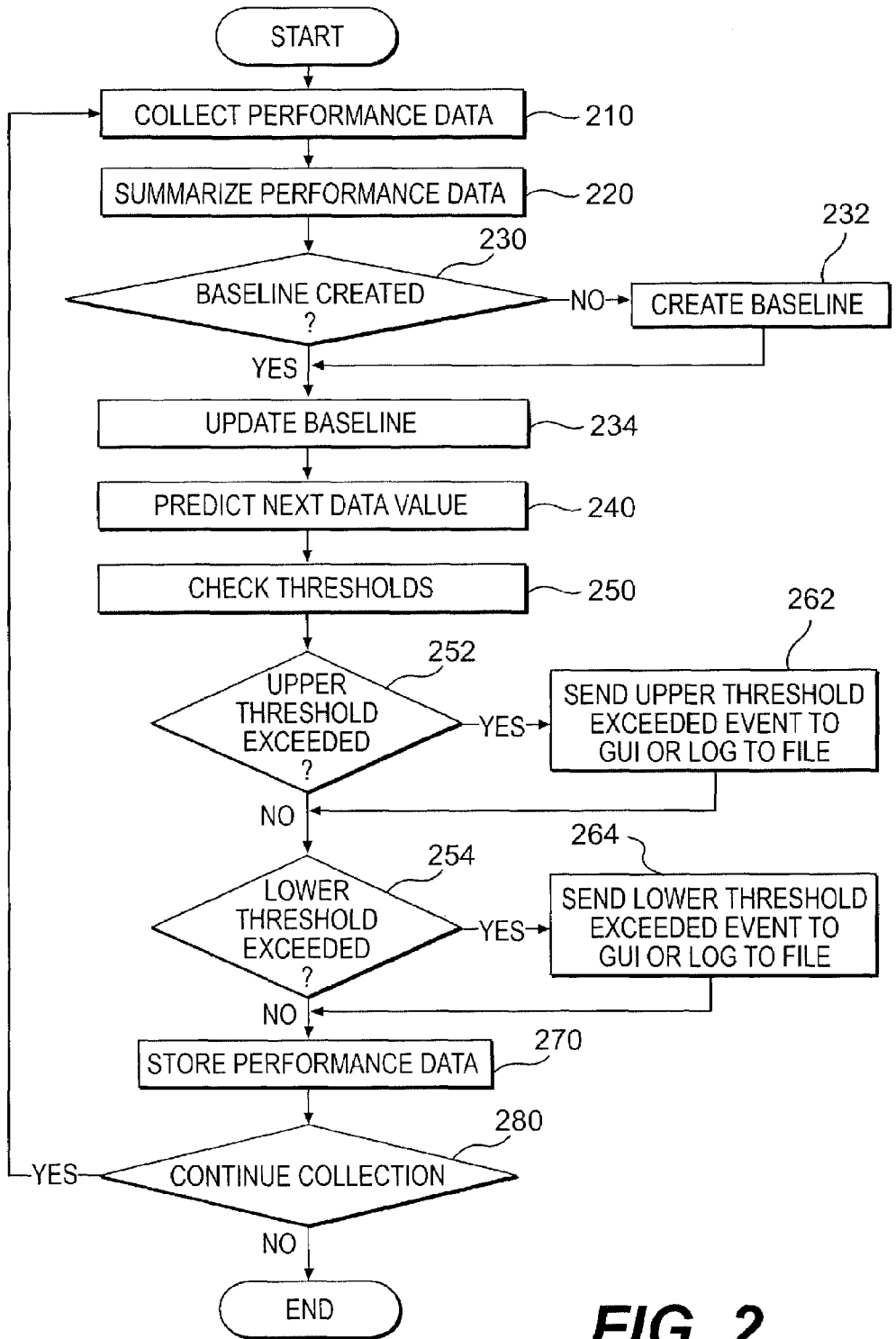
FIG. 2 is a flow chart illustrating an exemplary operation of the baselining and auto-thresholding system of FIG. 1.

FIG. 2 is a flow chart illustrating an exemplary operation of the baselining and auto-thresholding system 100. After performance data are collected (block 210) and summarized (block 220) into an average data point, the system 100 determines if a baseline object exists (block 230). The baseline object may contain data and methods necessary for predicting future performance data points based on past data points. If the baseline object does not exist, the data summarization module 120 creates the baseline object (block 232). Next, the baselining module 130 updates the baseline object by adding the summarized data point to the baseline object (block 234).

The baselining module 130 then predicts a next data point, which may include an upper and lower range (block 240). Then, the threshold monitor module 140 checks thresholds (block 250) by comparing the range of the previously predicted data value with an actual collected data value. If an upper threshold is violated (block 252), i.e., the actual collected data value is greater than the upper range, the threshold monitor module 140 generates, for example, an upper threshold exceeded event, to be transmitted to a GUI 152 or logged to a log file 154 (block 262). Similarly, if a lower threshold is violated (block 254), i.e., the actual collected data value is less than the lower range, the threshold monitor module generates, for example, a lower threshold exceeded event, to be sent to the GUI 152 or logged to the log file 154 (block 264). Next, the performance data may be stored in a secondary storage device 312 (shown in FIG. 3) (block 270). The method may then continue performance data collection (block 280) and return to block 210.

Figure 3:
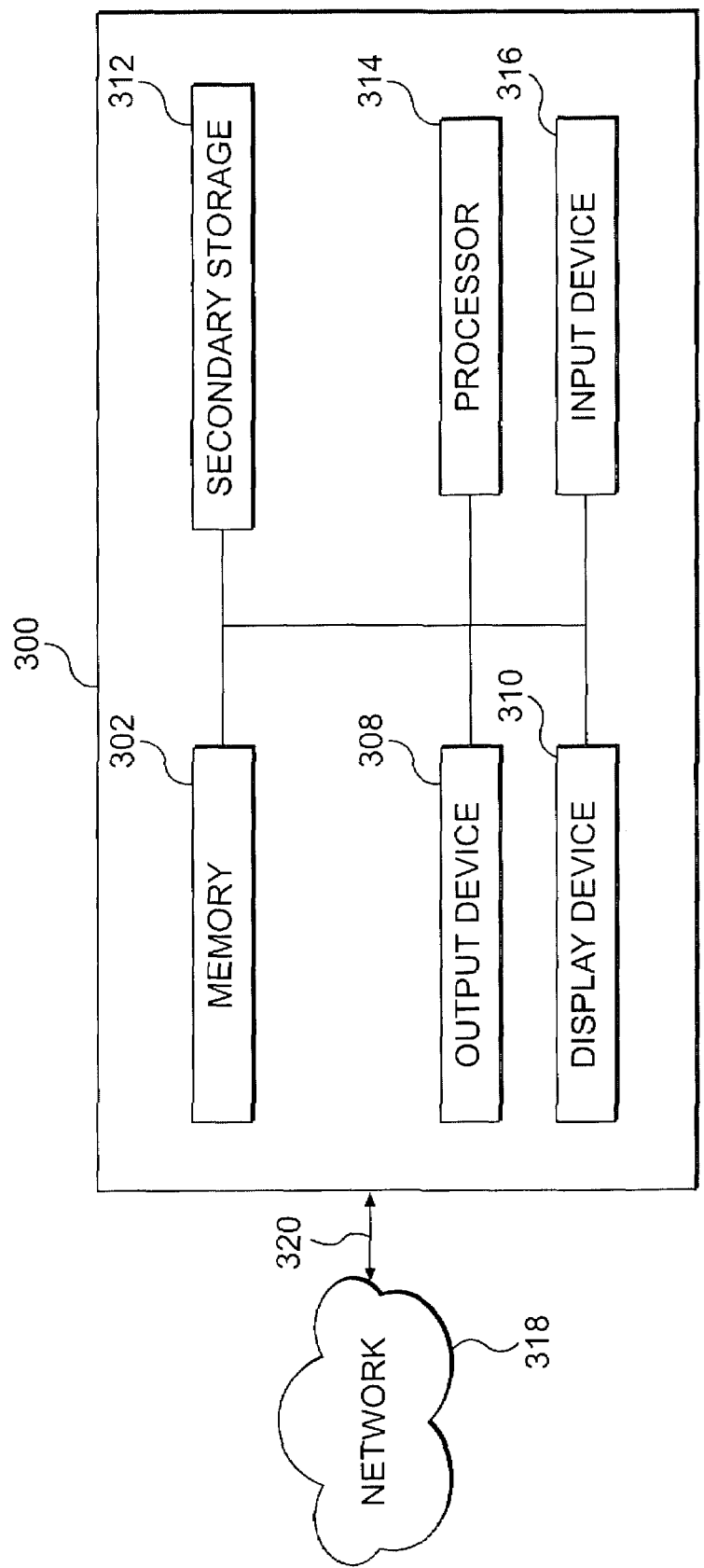
FIG. 3 illustrates exemplary hardware components of a computer that may be used in connection with the method for providing a baselining and auto-thresholding framework.

FIG. 3 illustrates exemplary hardware components of a computer 300 that may be used in connection with the method for providing a baselining and auto-thresholding framework. The computer 300 includes a connection 320 with a network 318 such as the Internet or other type of computer or telephone network. The computer 300 typically includes a memory 302, a secondary storage device 312, a processor 314, an input device 316, a display device 310, and an output device 308.

The memory 302 may include random access memory (RAM) or similar types of memory. The secondary storage device 312 may include a hard disk drive, floppy disk drive, CD-ROM drive, or other types of non-volatile data storage, and may correspond with various databases or other resources. The processor 314 may execute information stored in the memory 302, the secondary storage 312, or received from the Internet or other network 318. Instructions for providing a baselining and auto-thresholding framework may be stored in the memory 302 and/or the secondary storage 312. The input device 316 may include any device for entering data into the computer 300, such as a keyboard, keypad, cursor-control device, touch-screen (possibly with a stylus), or microphone. The display device 310 may include any type of device for presenting visual image, such as, for example, a computer monitor, flat-screen display, or display panel. The output device 308 may include any type of device for presenting data in hard copy format, such as a printer, and other types of output devices including speakers or any device for providing data in audio form. The computer 300 can possibly include multiple input devices, output devices, and display devices.

Although the computer 300 is depicted with various components, one skilled in the art will appreciate that the computer 300 can contain additional or different components. In addition, although aspects of an implementation consistent with the method for providing a baselining and auto-thresholding framework are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the computer 300 to perform a particular method.

While the method and apparatus for providing a baselining and auto-thresholding framework have been described in connection with an exemplary embodiment, those skilled in the art will understand that many modifications in light of these teachings are possible, and this application is intended to cover any variations thereof.

What is claimed is:

1. A method for providing a baselining and auto-thresholding framework, comprising:
    collecting performance data of all disparate devices in a storage network over an interval;
    summarizing the performance data collected from all disparate devices into a single data point;
    updating a baseline object based on the summarized data point;
    predicting a next data value based on the summarized data point;
    comparing the predicted data value with an actual collected data value that is collected from one of the disparate devices in the storage network; and
    generating a threshold violation event if a derivation exists between the predicted data value and the actual collected data value, wherein the performance data includes data from a subject device from which the actual collected data value is collected.

2. The method of claim 1, further comprising creating the baseline object using a data summarization module.

3. The method of claim 1, wherein the predicting step predicts the next data value using statistical analysis models.

4. The method claim 1, wherein the generating step generates the threshold violation event as an upper threshold exceeded event if the actual collected data value is greater than an upper range of the predicted data value.

5. The method of claim 1, wherein the generating step generates the threshold violation event as a lower threshold exceeded event if the actual collected data value is less than a lower range of the predicted data value.

6. The method of claim 1, further comprising sending the threshold violation event graphical user interface (GUI).

7. The method of claim 1, further comprising logging the threshold violation event to a log file.

8. The method of claim 1, wherein the predicting step uses a baselining module to predict the next data value.

9. The method of claim 1, wherein the comparing step uses a threshold monitor module to compare the predicted data value with the actual collected data value and to generate the threshold violation event.

10. An apparatus for providing a baselining and auto-thresholding framework, comprising:
    a data collection module that collects performance data of all disparate devices in a storage network over an interval;
    a data summarization module that summarizes the performance data collected from all disparate devices into a single data point;
    a baselining module that updates a baseline object and predicts a next data value based on the summarized data point; and
    a threshold monitor module that compares the predicted data value with an actual collected data value that is collected from one of the disparate devices in the storage network and generates a threshold violation event if a derivation exists between the predicted data value and the actual collected data value, wherein the performance data includes data from one or more subject devices from which the actual collected data value is collected.

11. The apparatus of claim 10, wherein the data summarization module creates the baseline object.

12. The apparatus of claim 10, wherein the next data value is predicted using statistical analysis models.

13. The apparatus of claim 10, wherein the threshold monitor module generates the threshold violation event as an upper threshold exceeded event if the actual collected data value is greater than an upper range of the predicted data value.

14. The apparatus of claim 10, wherein the threshold monitor module generates the threshold violation event as a lower threshold exceeded event if the actual collected data value is less than a lower range of the predicted data value.

15. The apparatus of claim 10, wherein the threshold monitor module sends the threshold violation event to a graphical user interface (GUI).

16. The apparatus of claim 10, wherein the threshold monitor module logs the threshold violation event to a log file.

17. The apparatus of claim 10, wherein the disparate devices include one or more hosts, one or more interconnect devices, and one or more storage devices.

18. The apparatus of claim 17, wherein the performance data includes device level and port level data collected from the one or more interconnect devices for received and transmitted bytes and flames.

19. The apparatus of claim 17, wherein the performance data includes data collected from the one or more hosts for read and write rates for logical and physical volumes.

20. The apparatus of claim 17, wherein the performance data is device dependent.

21. A computer readable storage medium comprising instructions for causing a computer to execute a method of providing a baselining and auto-thresholding framework by:

collecting performance data of all disparate devices in a storage network over an interval, including data from a subject device from which an actual collected data value is collected;

summarizing the performance data collected from all disparate devices into a single data point;

updating a baseline object based on the summarized data point;

predicting a next data value based on the summarized data point;

comparing the predicted data value with the actual collected data value that is collected from one of the disparate devices in the storage network; and generating a threshold violation event if a derivation exists between the predicted data value and the actual collected data value.

22. The computer readable storage medium of claim 21, further comprising instructions for creating the baseline object using a data summarization module.

23. The computer readable storage medium of claim 21, wherein the instructions for generating include instructions for generating the threshold violation event as an upper threshold exceeded event if the actual collected data value is greater than an upper range of the predicted data value.

24. The computer readable storage medium of claim 21, wherein the instructions for generating include instructions for generating the threshold violation event as a lower threshold exceeded event if the actual collected data value is less than a lower range of the predicted data value.

* * * * *

UNITED STATES PATENT AND TRADEMARK OFFICE
CERTIFICATE OF CORRECTION

PATENT NO. : 7,281,041 B2  Page 1 of 1
APPLICATION NO. : 10/284247
DATED : October 9, 2007
INVENTOR(S) : Jeremy Daggett It is certified that error appears in the above-identified patent and that said Letters Patent is hereby corrected as shown below:

In column 6, line 30, in Claim 4, after "method" insert -- of --.

In column 6, line 39, in Claim 6, after "event" insert -- to a --.

In column 7, line 26, in Claim 18, delete "flames" and insert -- frames --, therefor.

Signed and Sealed this

Twenty-second Day of July, 2008

JON W. DUDAS
*Director of the United States Patent and Trademark Office*